June 2, 1964  J. D. RICHARD  3,135,943
UNDERWATER THERMOMETRIC APPARATUS
Filed April 10, 1962  3 Sheets-Sheet 1
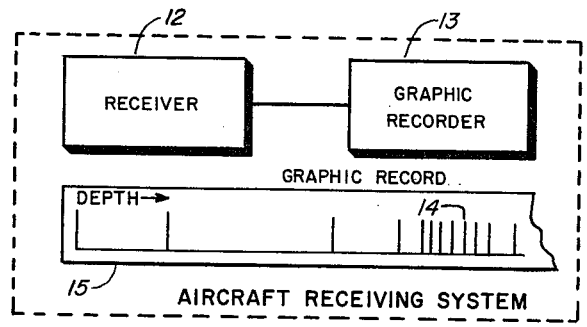
FIG. 1a
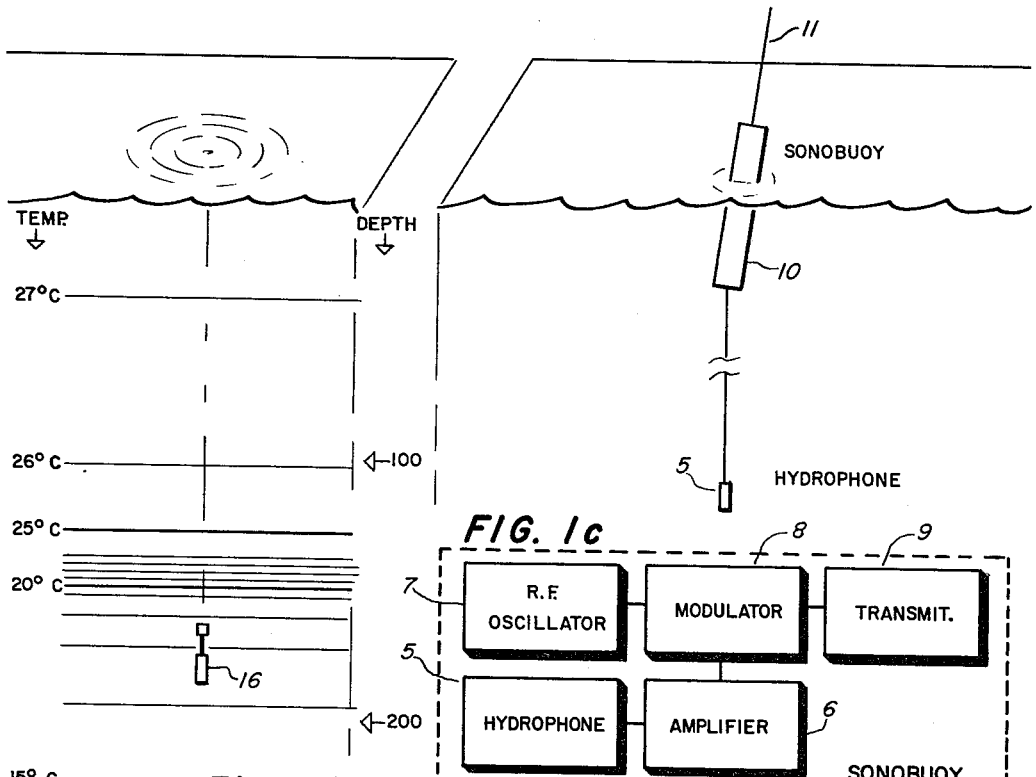
FIG. 1c
FIG. 1b
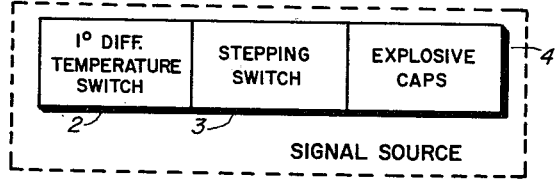
INVENTOR
Joseph D. Richard June 2, 1964   J. D. RICHARD   3,135,943
UNDERWATER THERMOMETRIC APPARATUS
Filed April 10, 1962   3 Sheets-Sheet 2

INVENTOR
Joseph D. Richard

June 2, 1964    J. D. RICHARD    3,135,943
UNDERWATER THERMOMETRIC APPARATUS
Filed April 10, 1962    3 Sheets-Sheet 3
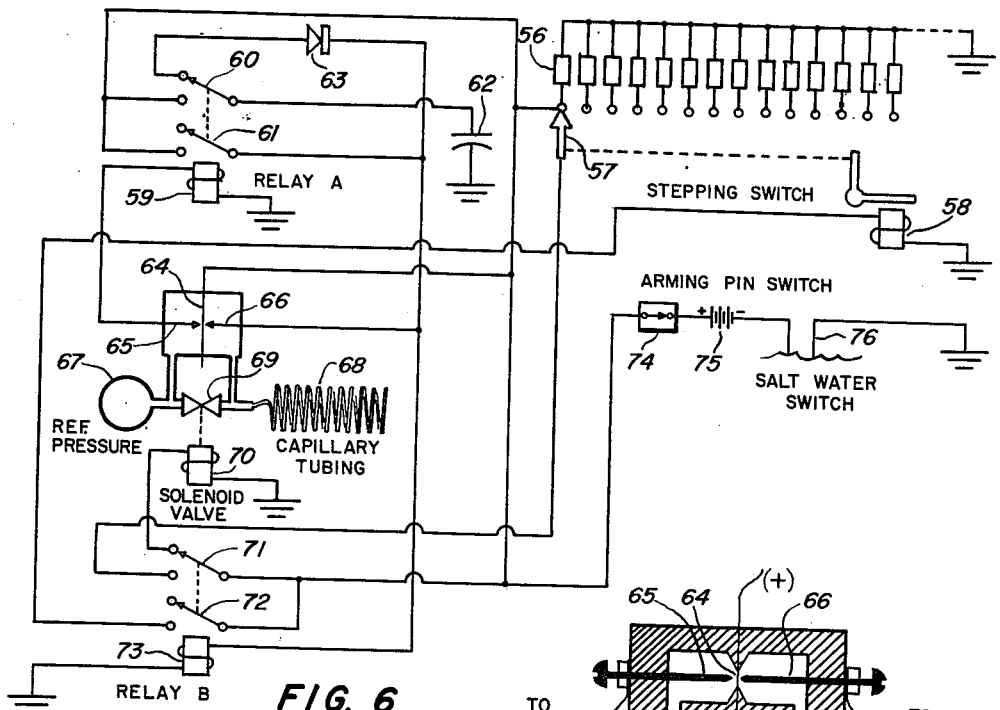
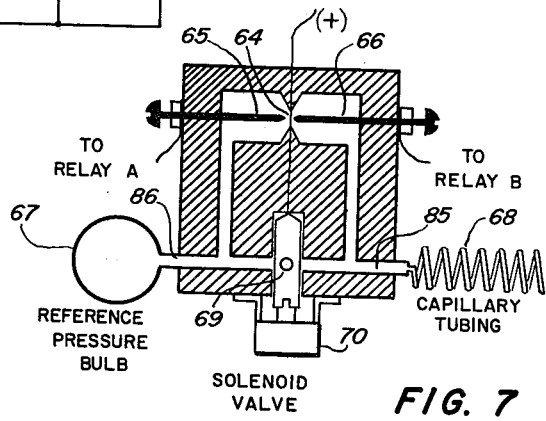
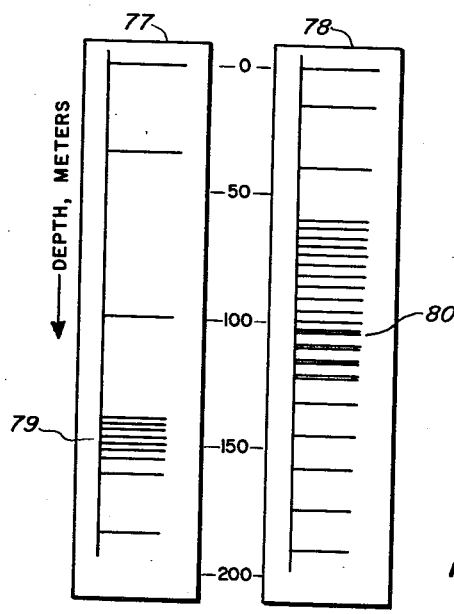
FIG. 8a    FIG. 8b
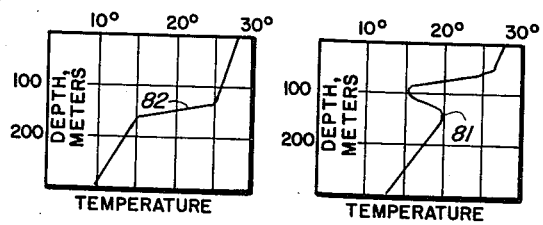
FIG. 9a    FIG. 9b
INVENTOR
Joseph D. Richard / 
United States Patent Office 3,135,943
Patented June 2, 1964

3,135,943
UNDERWATER THERMOMETRIC APPARATUS
Joseph D. Richard, Miami, Fla., assignor to Welex Electronics, a division of Halliburton Co., Washington, D.C., a corporation of Delaware
Filed Apr. 10, 1962, Ser. No. 186,447
2 Claims. (Cl. 340—5)

This invention relates generally to apparatus for measuring properties of the sea and more particularly to a measuring system wherein the vertical temperature profile of the upper layers of the sea may be rapidly determined.

In the past it has been the practice to measure the temperature of the ocean water as a function of depth in order to determine the refracting characteristics of the water as a medium for acoustic transmission. After the vertical temperature profile has been measured, certain computations may be then made in order to predict the acoustic transmission characteristics. With this knowledge, the detection ranges of various sonar systems may be predicted and the optimum operating parameters determined.

More recently, sound velocity meters have been used for the determination of the vertical velocity profile in the ocean. The direct measurement of acoustic velocity has certain advantages over computations based on temperature and depth information only since the latter technique ignores salinity variations which also affect acoustic velocity. However, velocity meters have the disadvantages of high expense and complexity and the data obtained must be processed further before the information may be actually used by the sonar operator.

An outstanding objection to the method used in the past for the determination of vertical velocity gradients in the ocean is the complexity of the procedure and the resulting time loss before usable information is obtainable.

An object of the present invention is to provide a system for the determination of vertical velocity gradients in the ocean which is devoid of the above mentioned disadvantages and difficulties and which is suitable for use by relatively unskilled persons.

Another object of the present invention is to provide a system for vertical velocity profile determination which displays the desired information almost immediately in a form which may be utilized without further processing.

The present invention provides an underwater signaling device which, when dropped in the ocean, produces acoustic pulses at various differential increments of temperature as it sinks through the water. When these acoustic pulses are received at a distance and displayed on a graphic recorder, the temperature gradients may be immediately visualized by the spatial relationships of the various pulses of the sequence.

Other objects and advantages will become more apparent from the study of the following specifications and drawings in which:

FIGURE 1 is an overall diagram which shows the general method of obtaining temperature gradients in the ocean according to my invention. FIGURE 1A shows the receiving system as it would function aboard an aircraft. FIGURE 1B shows the underwater signaling device after it has been dropped from an aircraft. FIGURE 1C shows a conventional sonobuoy which is used to receive the acoustic pulses.

FIGURE 6 shows the overall schematic of the system used for producing acoustic pulses at each degree of temperature change.

FIGURE 7 shows a detailed cross section of one type of differential pressure switch useable in the present invention.

FIGURE 8 shows the graphic records of signals received according to my invention corresponding to the temperature profiles shown in FIGURE 9.

FIGURE 9 shows two types of temperature profiles commonly observed in the ocean.

Figure 2:
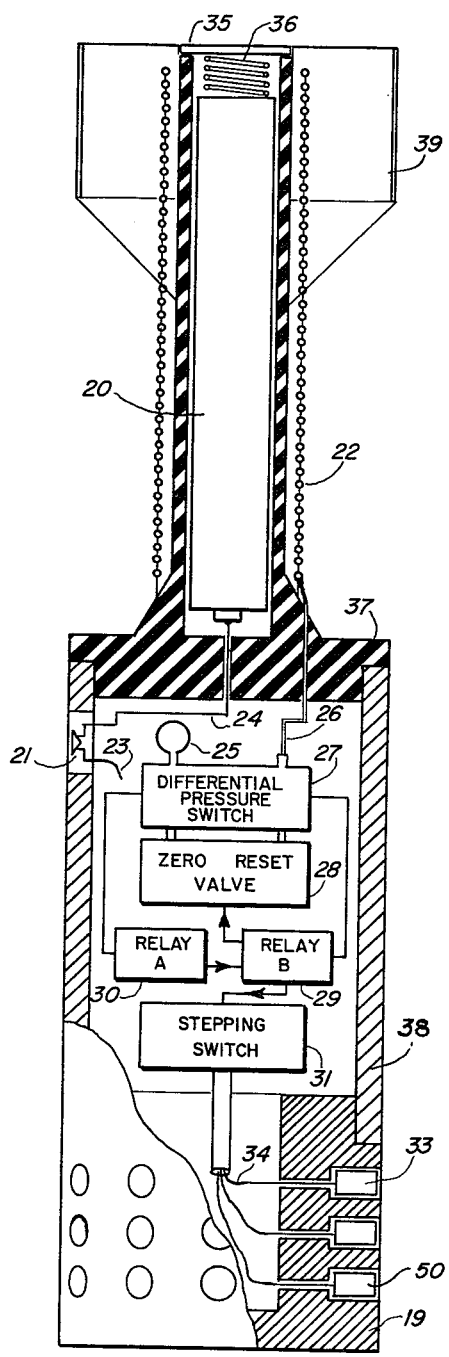
FIGURE 2 shows a sectional view of the underwater signaling device.
Figure 3:
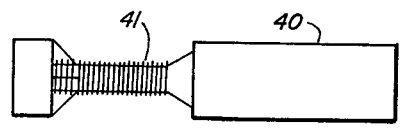
FIGURE 3 shows the overall relative dimensions and external appearance of the underwater signaling device.

Referring more specifically to FIGURE 1, an aircraft 1 is shown after having dropped the underwater signaling device 16 into the ocean. Acoustic pulses, produced at various differential increments of temperature by the underwater signaling device 16, are picked up by the hydrophone 5 which is a component of the typical sonobuoy 10. The sonobuoy 10 transmits by radio to the aircraft 1 electromagnetic signals which have the same temporal spacing as the acoustic signals received by the hydrophone 5.

FIGURE 1A shows the receiving system in the aircraft 1. Radio signals from the sonobuoy 10 are detected by the receiver 12. The demodulated signals are fed into the graphic recorder 13. The graphic record 15 shows a sequence of pulses which have been received from the sonobuoy 10.

FIGURE 1B shows the functional components of the underwater signaling device 16 in which the one degree differential temperature switch 2 is used to step the multicontact stepping switch 3 which in turn detonates the explosive caps 4 with each step. In this manner, one explosive cap is detonated for each degree change in temperature.

FIGURE 1C shows schematically the various components of the typical sonobuoy 10 in which the hydrophone 5 picks up acoustic signals from the surrounding water. The resulting electrical signals are amplified by the amplifier 6 which are then used to modulate the radio frequency signals from the oscillator 7 by means of the modulator circuit 8. The modulated R.F. signals are then transmitted by the transmitting stage 9.

The aircraft receiving system of FIGURE 1A and the sonobuoy of FIGURE 1C represent, schematically, equipments which are already in use for the detection of submarines by aircraft. It is intended that the underwater signaling device of the present invention be usable with these already existing systems virtually without alterations of any kind. It should also be pointed out that this underwater signaling system is also compatible with sonar receiving systems used on surface ships. It is only necessary that the presently described underwater thermometric device be dropped in the water. The resulting acoustic pulses may be detected by the sonar receiver and displayed on any convenient graphic recorder.

FIGURE 2 shows the underwater thermometric apparatus according to the present invention. A cylindrical housing 38 contains a differential pressure switch 27, one side of which is driven by the liquid pressure inside the capillary tubing 22. The opposite side of the pressure switch 27 is driven by the partially inflated reference pressure bulb 25. The zero reset valve 28, electrically operated by the relay 29, allows the instantaneous restoration of equilibrium between the two sides of the differential pressure switch 27. Expansion of the liquid in the capillary 22, resulting from a 1° temperature increase, closes the differential pressure switch 27 on the left side thereby actuating relay A30. Contraction of the liquid in the capillary 22 resulting from a 1° temperature decrease closes the differential pressure switch 27 on the right side thereby actuating relay B29. Relay A30, when actuated, causes two actuations of relay B29 in rapid succession as shown in FIGURE 6. Relay 29, when actuated, steps the stepping switch 31 and momentarily opens the zero reset valve 28. The zero reset valve is thus actuated after every 1° temperature change whether positive or negative. The stepping switch 31 is stepped one time for each 1° temperature decrease and two times for each 1° temperature increase. A series of explosive caps, such as the explosive cap 33, are mounted within the nosepiece 19 of the underwater device. Each explosive cap is connected to a separate contact of the stepping switch 31. One cap is thus exploded for each 1° temperature decreases and two caps are exploded (in rapid succession) for each 1° temperature increase. A battery 20 is shown within the tailpiece 37 of the underwater device. The arming pin switch 21 is closed when the device is dropped into the water. The salt water conducting path between the metal tail fin 39 and the metal housing 38 serves as an added safety switch on the negative side of the battery 20.

Figure 4:
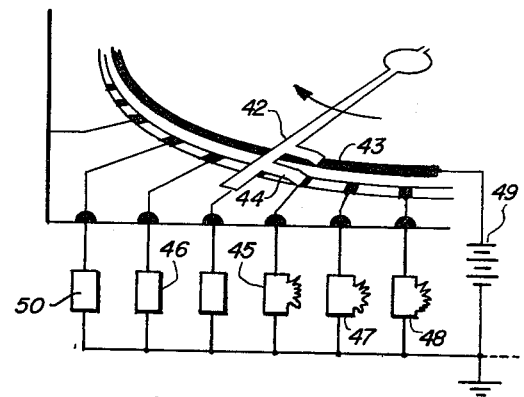
FIGURE 4 shows the contacts of the stepping switch used to detonate the explosive caps at each increment of differential temperature.

FIGURE 4 shows how the explosive caps are connected to the stepping switch contacts. The bridging contacts 42 and 44 connect the common contact 43 to the individual explosive caps as the stepping switch is actuated.

Figure 5:
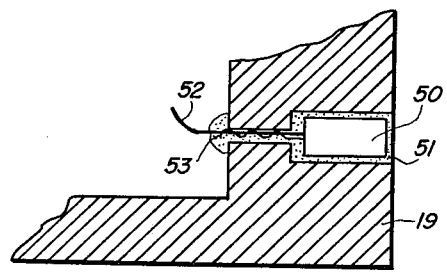
FIGURE 5 shows in detail the mounting of one of the explosive caps.

FIGURE 5 shows an explosive cap 50 mounted within the nosepiece 19 of the device. One lead 52 of the blasting cap 50 is well insulated and is connected to one of the contacts of the stepping switch 31. The other lead 53 of the explosive cap 50 is not insulated and is shorted to the metal nosepiece 19 by means of the conductive plastic compound 51.

In FIGURE 6 the arming pin switch 74 is closed when the device is dropped into the water. The salt water switch 76 is closed upon entry of the device into the water. The first explosive cap 56 is exploded instantly upon entry of the device into the sea water. The solenoid valve 70 is actuated to the closed position when the system is energized by the closure of the salt water switch 76. The schematic of FIGURE 6 thus shows the condition of the system immediately after water entry. The cap 56 is in the process of being exploded and the solenoid 70 has been actuated so that the valve 69 is closed. A conductive membrane 64 separates the two sides of the differential pressure cell. Assumming the normal situation of negative temperature gradients, the fluid in the capillary tubing begins to contract as the device sinks in the ocean. The reference pressure bulb 67 remains at essentially the same temperature and thus the conductive membrane 64 deflects to the right as the differential pressure increases. The contact 66 is spaced from the membrane 64 so that a 1° temperature decrease of the capillary fluid causes the membrane 64 to make contact with the contact 66. Similarly, a 1° temperature increase (much more rarely encountered in the ocean) makes the opposite contact 65. When the conductive membrane 64 makes the contact 66 (after a 1° temperature decrease) the coil 73 of relay B is actuated thereby switching the relay contacts 71 and 72. When the relay B is energized, the relay contact 71 energizes the wiper contact 57 of the stepping switch. The relay contact 72 energizes the coil 58 of the stepping switch thereby detonating the next explosive cap. Each time the relay B coil 73 is thus energized, an explosive cap is detonated. When the relay contact 71 is pulled down by the actuation of the relay B coil 73, the solenoid valve coil 70 is no longer energized so that the valve 69 is opened. This valve opening is only momentarily because it allows equalization of the differential pressure cell and thus the immediate opening of the contact 66 and return to normal of relay B contacts 71 and 72, whereupon the solenoid valve coil 70 is energized again to the closed position.

It may be seen from the above description that each 1° temperature decrease of the capillary 68 causes the firing of one explosive cap and at the same time causes the solenoid valve to restore the differential pressure switch to the null position. This sequence is initiated upon each actuation of relay B coil 73.

If a positive temperature gradient should be encountered a 1° temperature increase would expand the fluid in the capillary 68 sufficient to close the contact 65 of the differential pressure switch thereby energizing the coil 59 of relay A. When the relay A contact 61 is closed, relay B coil 73 is energized thereby initiating the above described sequence, namely the detonation of one cap and the equalization of the differential pressure switch. When the relay A is energized the switched contact 60 allows the capacitor 62 to charge. When the differential pressure cell is equalized (by the closure of relay B through the relay A contact 61) the relay A returns to normal allowing the capacitor 62 to discharge through contact 60 thereby momentarily closing relay B a second time. Thus relay B is actuated twice in rapid succession each time relay A is actuated by the differential switch contact 65. In the above manner, one explosive cap is detonated for each 1° temperature decrease and two explosive caps are detonated, in rapid succession, for each 1° temperature increase.

In FIGURE 7 the differential pressure switch is shown in greater detail. The solenoid valve 70 is shown energized in the closed position. When de-energized, the rotary solenoid 70 allows the valve 69 to rotate by spring action so that pressure is equalized between the reference pressure bulb 67 and the capillary tubing 68.

FIGURE 9A shows a typical temperature-depth profile of the ocean. It may be seen that a steep negative temperature gradient exists at a depth of about 150 meters.

FIGURE 9B shows a more unusual temperature-depth relationship sometimes observed in the ocean. A positive temperature gradient may be seen between 100 and about 125 meters.

FIGURE 8A shows the signals received from the underwater thermometric apparatus described herein corresponding to conditions as shown in FIGURE 9A. The steep negative gradient 79 may be easily seen centered at a depth of 150 meters. The spacing of the 1° temperature differential pulses indicates the steepness of the gradient.

In FIGURE 8B, the graphic record 78 shows the signal sequence corresponding to conditions shown in FIGURE 9B. The positive gradient 80 is easily seen between 100 and 125 meters. This particular record would indicate the presence of a well defined sound channel with an axis depth of about 100 meters.

It will be seen therefore that I have provided an underwater signaling method and device which readily yields information on steepness and depth of temperature gradients in the ocean.

I have specifically described a system which is directly usable with existing airborne submarine detection systems. One method of submarine detection by aircraft involves the dropping of sonobuoys into the water, dropping an explosive charge near the sonobuoys, and then recording subsequent echoes as picked up by the sonobuoy hydrophones by means of a radio link between the sonobuoy and the aircraft. The present invention, as shown in FIGURE 1 may be readily used with the above described explosive echo ranging system. The underwater signaling device may be dropped in the water anywhere within several miles of the sonobuoys and the spatial relationship of the pulses, as recorded on a graphic recorder in the plane, immediately shows the depth at which the large explosive charge should be set to detonate in order to achieve maximum detection range.

The present invention is not intended to be limited to use by aircraft engaged in explosive echo ranging. The same device, without alterations, is equally applicable for use with helicopters engaged in dipped sonar echo ranging, surface ships using variable depth sonar, surface ships using hull mounted sonar, and surface ships using towed sonar. The identical apparatus, inside a positively buoyant housing, could be used by submarines so that the temperature structure of the surface layer could be determined while remaining deeply submerged.

Another advantage of the present invention is that the graphic record obtained is easily converted to digital information suitable for use with automatic sound ray computers and plotters.

The acoustic pulses herein described are produced by the electric detonation of an explosive cap. This is a very efficient acoustic pulse source which can be received by almost all sonar receiving systems. Electric explosive caps transform electrical energy into heat which in turn ignites an explosive charge. These caps are commercially available in a wide variety of charge sizes. When using higher frequency sonar equipments it might be desirable to use a fixed frequency pulse source in the underwater signaling device which is set at the exact frequency of the sonar equipment with which it is to be used.

It may be advantageous to use a sea water activated battery mounted within the tail section of the device shown in FIGURE 2. In this case the tail section would have to open to the outside water and be readily floodable. A possible disadvantage to the sea water activated battery is the activation time which usually is at least several seconds. A reasonably short activation delay might be desirable, however, to allow the capillary and fluid to reach water temperature, after the transition from air to water, before signaling commences.

It is assumed in the presently described device that the sinking rate is known and constant. Terminal velocity in water is reached very quickly. The weight and shape of the device can be adjusted to achieve some desired sinking rate which should typically be somewhere between 10 and 20 feet per second. The time constant of the temperature sensor is the limiting factor in the selection of sinking rates.

It is obvious that other types of differential pressure switches could be used to sense the expansion and contraction of the capillary fluid. A particularly promising differential pressure switch has been made using a fused quartz Bourdon element mounted within a capsule. Deflection of the free end of the Bourdon is proportional to the differential pressure inside and outside the Bourdon. The Bourdon itself consists of a helix of small diameter quartz tubing. It is also obvious that the presently described system is responsive to changes in temperature only and does not measure absolute temperature. The capillary fluid may be any convenient fluid with a suitable coefficient of thermal expansion. Xylene is commonly used for this purpose.

In conclusion, while I have described particular embodiments of my invention for purposes of illustration, it will be understood that various modifications and adaptations thereof may be suggested to those skilled in the art without departing from the spirit and scope of the invention as defined in the following claims.

What is claimed is:

1. Apparatus for indicating vertical temperature gradients in the ocean comprising in combination: a negatively buoyant housing suitable for dropping in the ocean; a sealed capillary tubing outside the said housing exposed to the temperature of the surrounding medium; a thermally expandable fluid inside the said capillary; a differential pressure switch having a reference pressure at the first input and the capillary fluid pressure at the second input and including first and second contacts; means for closing said first electrical contact in response to a predetermined decrease of pressure in the said capillary relative to the said reference pressure, and for closing said second electrical contact in response to a predetermined increase of pressure in the said capillary relative to the said reference pressure; a valve separating the two input pressures of the said differential pressure switch; a battery; a series of electrically detonated explosive charges, each ventable to the outside medium; means for detonating at least one explosive charge in response to each closure of the said first electrical contact; means for detonating at least two explosive charges in rapid succession in response to each closure of the said second electrical contact; and means for momentarily opening the said valve in response to the closure of either the said first or second electrical contacts, the said differential pressure switch being thereby restored to equilibrium after each incremental temperature change as the said housing sinks in the ocean.

2. Apparatus for indicating vertical temperature gradients in the ocean comprising in combination: a housing suitable for dropping into the ocean, the said housing being watertight, resistant to pressure, and negatively buoyant; a sealed capillary tubing outside the said housing exposed to the temperature of the surrounding medium; a thermally expandable fluid inside the said capillary; a differential pressure switch having a reference pressure at the first input and the capillary fluid pressure at the second input and including first and second contacts; means for closing said first electrical contact in response to a predetermined decrease of pressure in the said capillary relative to the said reference pressure, and for closing said second electrical contact in response to a predetermined increase of presure in the said capillary relative to the said reference pressure; a valve separating the two input pressures of the said differential pressure switch; a battery; a multi-contact stepping switch; a series of electrically detonatable explosive charges, each ventable to the surrounding medium, each of the said explosive charges being connected to one of the contacts of the said multi-contact stepping switch; means for actuating the said stepping switch at least one time in response to each closure of the said first electrical contact; means for actuating the said stepping switch at least two times in response to each closure of the said second electrical contact; and means for momentarily opening the said valve in response to the closure of either the said first or the said second electrical contacts, the said differential pressure switch being thereby restored to the null position in response to each incremental temperature change as the said housing sinks in the ocean.

References Cited in the file of this patent
UNITED STATES PATENTS

| 2,520,814 | Rule | Aug. 29, 1950 |
| 2,750,794 | Downs | June 19, 1956 |
| 3,038,143 | Dow | June 5, 1962 |

FOREIGN PATENTS

| 1,264,760 | France | May 15, 1961 |